(12) United States Patent
Curley

(10) Patent No.: US 6,754,762 B1
(45) Date of Patent: Jun. 22, 2004

(54) REDUNDANT BUS SWITCHING

(75) Inventor: Dennis P. Curley, St. Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 445 days.

(21) Appl. No.: 09/799,336

(22) Filed: Mar. 5, 2001

(51) Int. Cl.$^7$ .................. G06F 13/00; G06F 11/16
(52) U.S. Cl. .................. 710/316; 711/40; 711/1
(58) Field of Search .................. 710/300, 305, 710/316; 714/1, 2, 40–44, 23

(56) References Cited

U.S. PATENT DOCUMENTS

| | | | | |
|---|---|---|---|---|
| 4,634,110 A | * | 1/1987 | Julich et al. | 714/11 |
| 5,809,533 A | * | 9/1998 | Tran et al. | 711/141 |
| 5,828,613 A | * | 10/1998 | Hatakeyama et al. | 365/205 |
| 6,374,322 B1 | * | 4/2002 | Saze et al. | 710/316 |
| 6,434,703 B1 | * | 8/2002 | Parrish et al. | 713/310 |
| 6,564,274 B1 | * | 5/2003 | Heath et al. | 710/105 |
| 6,614,752 B1 | * | 9/2003 | Parrish et al. | 370/217 |
| 2002/0032825 A1 | * | 3/2002 | Saze et al. | 710/300 |

* cited by examiner

Primary Examiner—Xuan M. Thai
(74) Attorney, Agent, or Firm—Robert E. Greenstien

(57) ABSTRACT

A pair of buses connect devices and a processor on a backplane. Each device monitors both buses for a bus reset that is produced by the processor on detecting a fault with the active bus, at which time the processor switches to the inactive bus and produces a bus reset signal on the inactive bus, telling the devices to switch to the inactive active bus. The devices are programmed to respond to the reset signal on either bus to make it the active bus.

5 Claims, 2 Drawing Sheets

REDUNDANT BUS SWITCHING

BACKGROUND

This invention relates to the operation of a bus in a computer backplane.

The circuitry and mechanical elements used to connect the boards of a computer system are commonly called a backplane, which contains a bus for communicating data between the components on the boards.

Different protocols or standards have been set for the bus, one example, the IEEE 1394, provides for a bus reset signal telling all the components to reinitialize their bus connection, which might happen in the event of a bus fault due to a problem with one of the components or a faulty backplane connection. Under this standard, the reset signal is applied to both channels (conductors) of the duplex bus. Each bus has two channels, one the strobe channel, the other for the data.

In the event of a persistent problem with the bus in some way, the system will lock up, requiring complete re-initialization, a manual, time consuming process. This type of system correction is not sufficient for high performance fault intolerant systems, such as space craft controls, that must operate automatically with minimal interruption.

SUMMARY OF THE INVENTION

An object of the present invention is to provide an improved bus connection in a computer system.

According to the present invention the backplane contains a pair of duplex buses. Each component contains a switch to select one of the buses (the active bus) and a controller which controls the state of the switch as a function of the signal characteristics on the bus that is in operation. A component, for instance, a master controller on the bus, is programmed to detect a fault in the operation of the active bus, switching to the inactive bus and transmitting a bus reset signal on the inactive bus. The other controllers in the other components on detecting the reset signal switch to the inactive bus, now the active bus. The bus reset signal is used to switch between buses rather than reset the active bus, and this provides a more rapid and reliable connection between the components on the bus. Each controller is programmed or hard wired to detect the bus reset and operate the switch to change to the inactive bus (making it active).

A feature of the invention, a standard backplane and protocol can be used with commercial processors and peripherals.

Other objects, benefits and features of the invention will apparent to one of ordinary skill in the art from the drawing and following description.

DESCRIPTION

Figure 1:
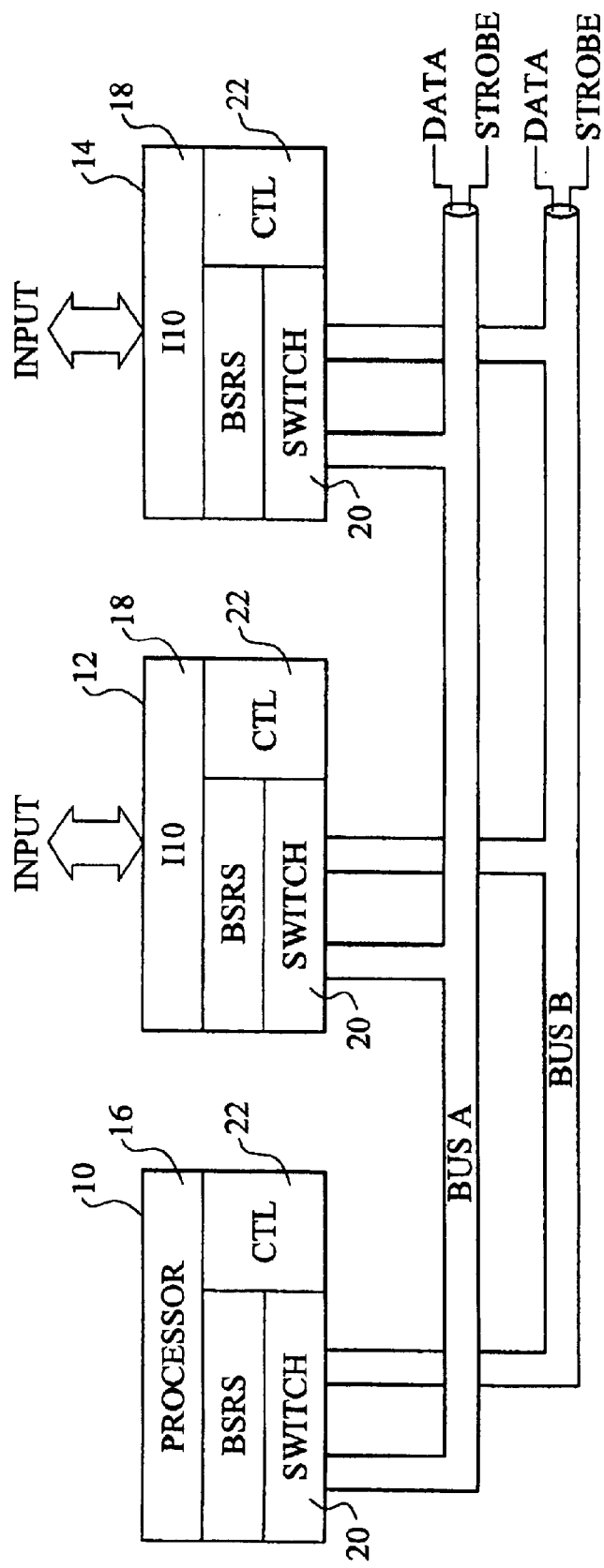
FIG. 1 is a functional block diagram showing several components and a master controller on a backplane in an arrangement that embodies the present invention.

FIG. 1 shows a master control 10 and two slave devices 12, 14 are connected to a pair of buses, bus A, bus B, each having two channels, one for data, the other for a strobe signal. The master control 10 contains a processor 16. Each of the slave devices 12, 14 contains an I/O 18 for a bidirectional input and other local functions. Many more devices may be connected to the bus A and B. A bus switch 20 and switch control (CTL) 22 in the master controller 10 is also included in the slave devices 12, 14. The switch control 22 selects either bus A or bus B. Bus A is presumed the default bus or active bus for this discussion. Each I/O is of course programmable and includes a bus switch recognition sequence BSRS that mirrors, also programmed in the processor. The purpose of the BSRS sequence is to detect that a bus reset signal has been produced on the data and strobe channels of the inactive bus B by the master controller 10 and cause the switch control 22 to switch to the inactive bus B or vice versa if bus B is the active bus. In practice, the slave devices 12, 14 are also programmed to produce the reset signal on the data and strobe channels of the inactive bus, which will result in it becoming the active bus. The master controller 10 and slave devices 12, 14 are identical with respect to the bus reset and switch function and programming.

Figure 2:
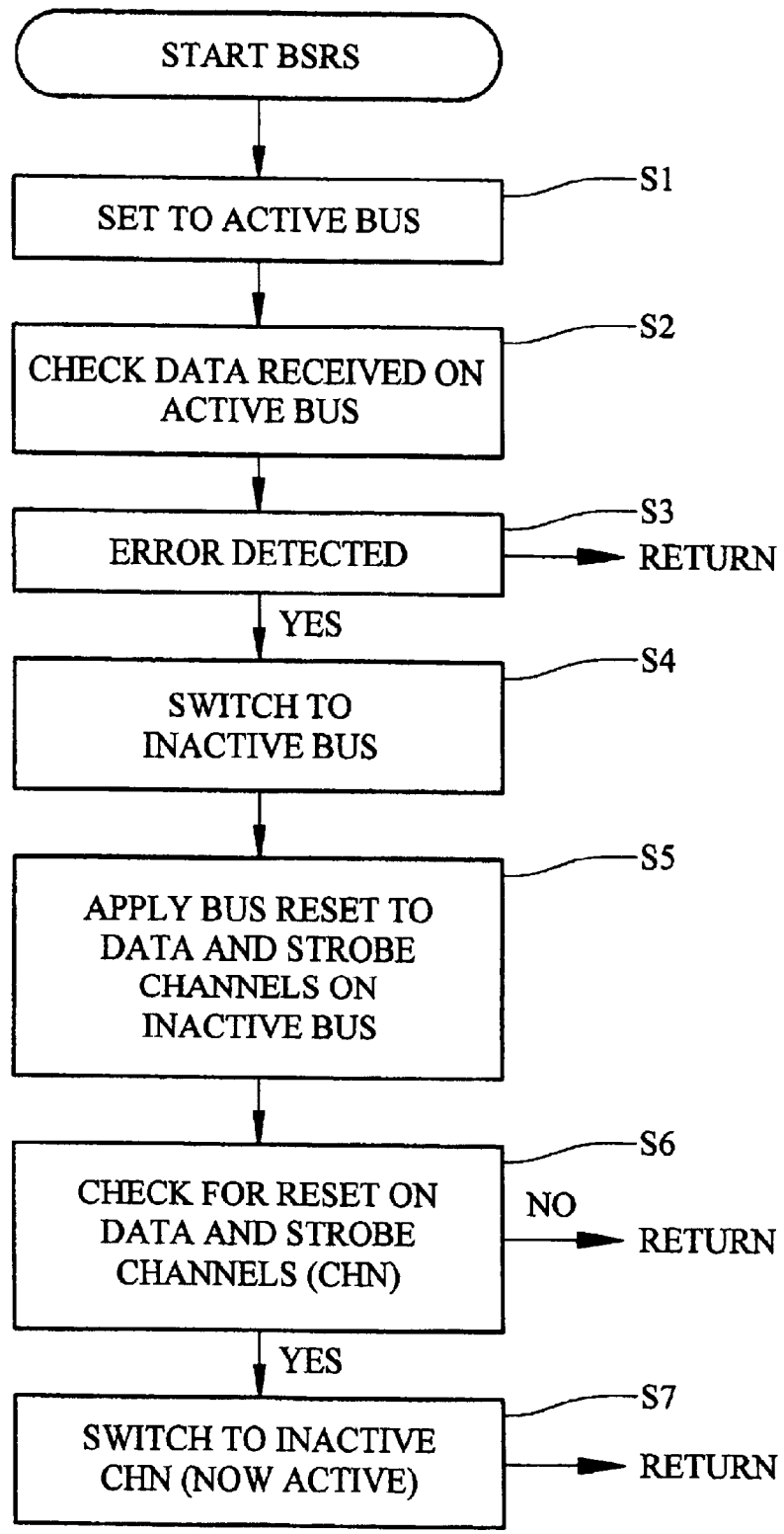
FIG. 2 is a flow chart showing the BSRS steps.

FIG. 2 assumes that bus A is the default or active bus. Once again, each device 10, 12, 14 is programmed with the BSRS which operates autonomously in each device as part of the devices normal operations (a sub-program). The first step S1 locally configures bus A as the active bus, that is, connects and initialize the device on bus A. During the sequence, the data being received on bus A is checked S2 for faulty data or some other anomaly requiring a bus rest, and if the data is faulty S3, the device, for instance the master controller 10, detects the faulty data and switches S4 to bus B, the inactive bus, and generates a bus reset command S5 on the data and strobe channels on bus B. At the next step S6 in the BSRS, the other devices 12, 14 detect the reset signal (its new presence) on the data and strobe channels of bus B. That is, an affirmative answer to this test in any device 10, 12, 14 will cause that device to the switch S7 to the bus where the reset signal is present, now the active bus. In this example, the master controller 10 has already switched to the inactive bus after determining the fault. The BSRS sequence repeats cyclically, and should a fault be detected on bus B while active, a device 10, 12, 14 sensing the fault will produce a bus reset signal on the data and strobe channels on A, causing the remaining devices still on bus B to switch back to bus A, now the active bus.

One skilled in the art may make modifications, in whole or in part, to a described embodiment of the invention and its various functions and components without departing from the true scope and spirit of the invention.

What is claimed is:

1. A data signal transmission system, comprising:

first and second buses; and signal processing means connected to the first and second buses for providing a bus reset signal on either bus, comprising means for switching from the first bus to the second bus for data signal transmission with other devices over the second bus on detecting a fault with the first bus and providing the bus reset signal on the second bus; and a plurality of devices comprising moans connected simultaneously to the first and second buses for detecting the bus reset signal and additionally means for switching from the first bus to the second bus on detecting the bus reset signal on the second bus and for data signal transmission among the devices and the signal processing means on the second bus.

2. The system described in claim 1, wherein the buses are duplex comprising strobe and data conductors and the bus reset signal is produced on both conductors.

3. The data transmission system of claim 2, wherein the buses are part of computer backplane.

4. A method for providing a redundant bus connection between a plurality of signal processing devices on a backplane, comprising:

connecting each device to at least two buses to detect a bus reset signal on any bus;

connecting each device through a switch that is part of the device to send and receive data signals over the one bus carrying the bus reset signal; and detecting an error with the one bus at one of the device, to produce the bus reset signal.

5. A computer backplane, comprising:

a pair of buses;

a first device comprising a switch to connect the first device to an active one of the buses, a switch control that is connected to both buses for detecting a bus reset on an inactive one of the buses to cause the switch to connect the first device to the inactive bus and means for detecting a fault on the active bus to produce the bus reset signal on the inactive bus; and a second device comprising a switch to connect the second device the active one of the buses and a switch control that is connected to both buses for detecting the bus reset on an inactive one of the buses to cause the switch to connect the second device to the inactive bus, whereby the inactive bus becomes the active bus connecting the first and second devices.

* * * * *